United States Patent
Shchepetov et al.

(10) Patent No.: US 9,473,695 B2
(45) Date of Patent: *Oct. 18, 2016

(54) CLOSE FOCUS WITH GPU

(71) Applicant: Google Technology Holdings LLC, Mountain View, CA (US)

(72) Inventors: Denis Shchepetov, Grayslake, IL (US); Eric F Aas, Windsor, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,524

(22) Filed: Oct. 5, 2015

(65) Prior Publication Data
US 2016/0028941 A1   Jan. 28, 2016

Related U.S. Application Data

(63) Continuation of application No. 14/036,222, filed on Sep. 25, 2013, now Pat. No. 9,154,686.

(51) Int. Cl.
*G03B 7/00* (2014.01)
*H04N 5/232* (2006.01)

(52) U.S. Cl.
CPC ............... *H04N 5/23212* (2013.01)

(58) Field of Classification Search
USPC ....... 396/67, 89, 96, 123, 124, 213; 348/345
See application file for complete search history.

(56) References Cited

U.S. PATENT DOCUMENTS

| | | | | |
|---|---|---|---|---|
| 4,963,985 A | * | 10/1990 | Isoguchi | H04N 5/2354 348/348 |
| 5,727,242 A | * | 3/1998 | Lo | G03B 35/00 348/E13.007 |
| 7,336,803 B2 | | 2/2008 | Mittal et al. | |
| 7,965,325 B2 | * | 6/2011 | Imamura | G06T 3/0062 348/241 |
| 8,131,142 B2 | * | 3/2012 | Yumiki | H04N 5/23219 396/123 |
| 8,237,802 B2 | * | 8/2012 | Kim | H04N 5/23212 348/208.1 |
| 8,274,596 B2 | * | 9/2012 | Pincenti | H04N 5/23212 348/208.12 |
| 8,326,042 B2 | * | 12/2012 | Wu | G06F 17/3079 348/700 |
| 9,007,512 B2 | * | 4/2015 | Hong | H04N 5/23212 348/345 |
| 9,154,686 B2 | * | 10/2015 | Shchepetov | H04N 5/23212 |
| 2004/0022531 A1 | * | 2/2004 | Schinner | G03B 7/00 396/67 |
| 2008/0291333 A1 | | 11/2008 | Subbotin et al. | |
| 2010/0188511 A1 | * | 7/2010 | Matsumoto | G06T 7/20 348/169 |
| 2010/0265342 A1 | * | 10/2010 | Liang | H04N 5/145 348/208.4 |
| 2013/0021516 A1 | * | 1/2013 | Kikuchi | H04N 5/23209 348/345 |
| 2015/0085176 A1 | | 3/2015 | Aas et al. | |

\* cited by examiner

*Primary Examiner* — David Gray
*Assistant Examiner* — Warren K Fenwick
(74) *Attorney, Agent, or Firm* — Morris & Kamlay LLP

(57) ABSTRACT

Disclosed are systems and methods for focusing a digital camera to capture a scene. It is first detected that a change in a scene requires the digital camera to be focused or refocused. The camera focus is automatically scanned from a closest settable distance to farther distances until a first closest object in the scene is detected. Once the first closest object in the scene is detected, the camera focus is set at the distance of the first closest object and a finer scan is executed. In an embodiment, a dynamic movement threshold is calculated and used to determine that the change in scene requires the digital camera to be focused or refocused.

6 Claims, 9 Drawing Sheets

CLOSE FOCUS WITH GPU

TECHNICAL FIELD

The present disclosure is related generally to digital camera focusing and, more particularly, to a system and method for identifying and focusing on nearest objects in a scene via a digital camera.

BACKGROUND

The introduction of the consumer-level film camera changed the way we saw our world, mesmerizing the public with life-like images and opening up an era of increasingly visual information. However, as imaging technologies continued to improve, the advent of inexpensive digital cameras would eventually render traditional film cameras obsolete, along with the sepia tones and grainy pictures of yesteryear. However, the digital camera offered the one thing that had eluded the film camera—spontaneity and instant gratification. Pictures could be taken, erased, saved, instantly viewed or printed and otherwise utilized without delay.

The quality of digital image technology has now improved to the point that very few users miss the film camera. Indeed, most cell phones, smart phones, tablets, and other portable electronic devices include a built-in digital camera. Nonetheless, despite the unquestioned dominance of digital imaging today, one requirement remains unchanged from the days of yore: the requirement to focus the camera.

Today's digital cameras often provide an auto focus function that automatically places portions of a scene in focus. However, the portions of a scene that appear in focus are generally those selected by the user via touch screen input, or, alternatively, those that yield the greatest focus value. Unfortunately, the requirement for the user to hand-select the object of interest introduces an extra step and accompanying delay when the user is attempting to photograph the object of interest. Similarly, the focus value magnitude achieved at different distances is generally not helpful in identifying which object in the scene is likely of interest. For example, consider a flower situated in a field of grass; the flower may have a lower focus value than the surrounding grass, but the flower is more likely to be the object of interest in the scene.

It will be appreciated that this Background section represents the observations of the inventors, which are provided simply as a research guide to the reader. As such, nothing in this Background section is intended to represent, or to fully describe, prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
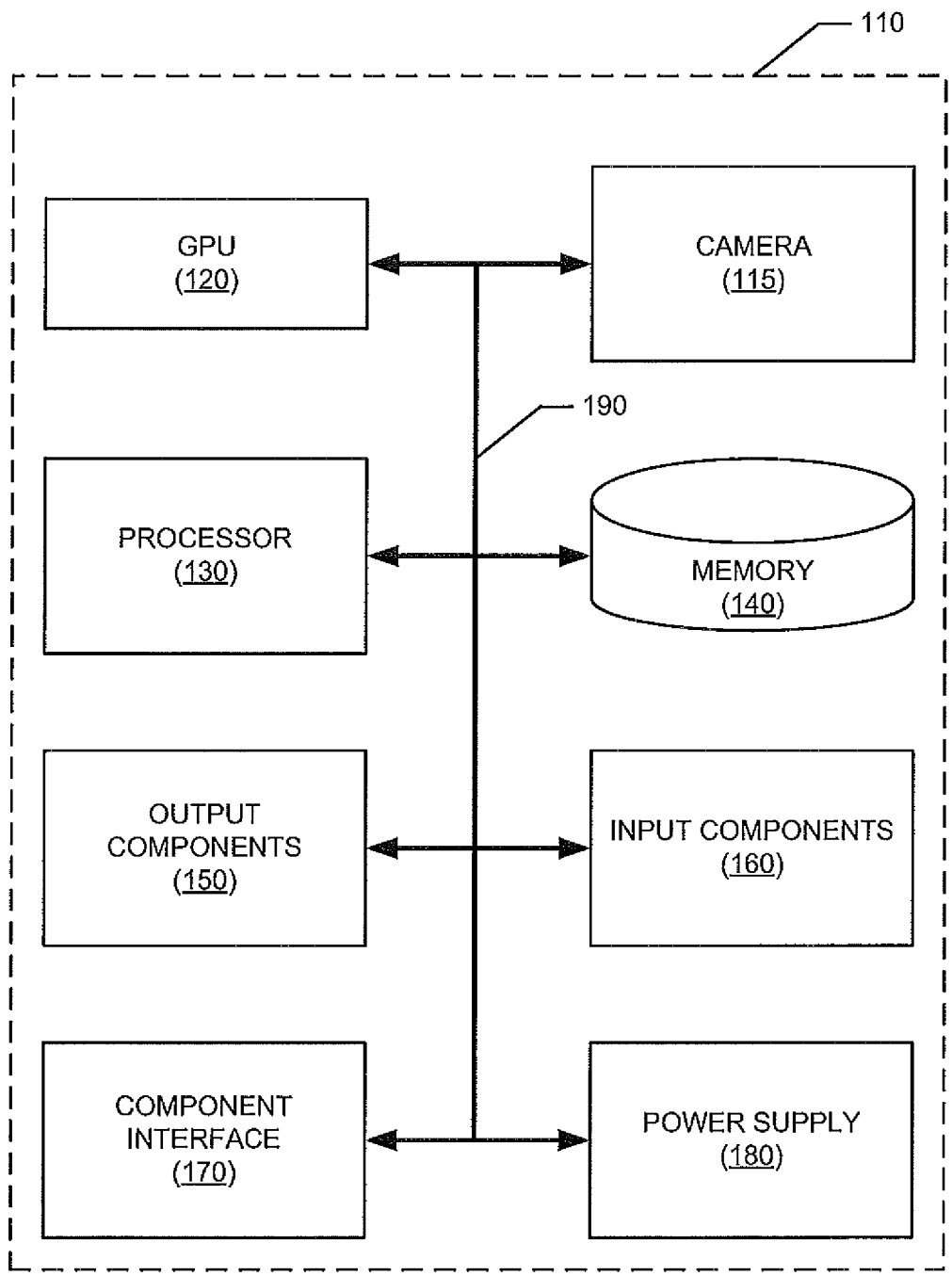
FIG. 1 is a logical diagram of a mobile user device within which embodiments of the disclosed principles may be implemented.

Turning to the drawings, wherein like reference numerals refer to like elements, techniques of the present disclosure are illustrated as being implemented in a suitable environment. The following description is based on embodiments of the disclosed principles and should not be taken as limiting the claims with regard to alternative embodiments that are not explicitly described herein.

Before providing a detailed discussion of the figures, a brief overview will be given to guide the reader. In the disclosed examples, a digital camera is configured to detect movement in a scene, to trigger refocusing of the scene from near to far based on the detected movement, and to set the focus distance at the distance of the closest object. In an embodiment, each frame is processed using a graphics processing unit (GPU) of the camera to accelerate the focus decision (by identifying motion more efficiently) and to accelerate the refocusing process. A GPU is a specialized chip, board or module that is designed specifically for efficient manipulation of digital graphics. In particular, GPUs typically embody a more parallel structure than general-purpose CPUs, allowing more efficient processing of large blocks of data.

In an embodiment, the GPU identifies movement by calculating a pixel-based frame difference and estimating scene complexity at a camera frame rate to detect scene stability in real time (at each new frame). In addition to the speed advantage that this approach provides compared to CPU-based systems that wait for multiple frames, this approach also provides lower complexity compared to techniques that rely on per-block motion vectors estimated during compression, e.g., techniques used in video processing. While certain of the disclosed embodiments simulate image jitter to derive a frame-specific threshold level for judging inter-frame movement (previous frame to current frame), it will be appreciated that other means of detecting motion may instead be used.

Turning now to a more detailed discussion in conjunction with the attached figures, the schematic diagram of FIG. 1 shows an exemplary device within which aspects of the present disclosure may be implemented. In particular, the schematic diagram illustrates a user device 110 including several exemplary internal components. Internal components of the user device 110 may include a camera 115, a GPU 120, a processor 130, a memory 140, one or more output components 150, and one or more input components 160.

The processor 130 can be any of a microprocessor, microcomputer, application-specific integrated circuit, or the like. For example, the processor 130 can be implemented by one or more microprocessors or controllers from any desired family or manufacturer. Similarly, the memory 140 may reside on the same integrated circuit as the processor 130. Additionally or alternatively, the memory 140 may be accessed via a network, e.g., via cloud-based storage. The memory 140 may include a random access memory (i.e., Synchronous Dynamic Random Access Memory (SDRAM), Dynamic Random Access Memory (DRAM), RAMBUS Dynamic Random Access Memory (RDRM) and/or any other type of random access memory device). Additionally or alternatively, the memory 140 may include a read only memory (i.e., a hard drive, flash memory and/or any other desired type of memory device).

The information that is stored by the memory 140 can include code associated with one or more operating systems and/or applications as well as informational data, e.g., program parameters, process data, etc. The operating system and applications are typically implemented via executable instructions stored in a non-transitory computer readable medium (e.g., memory 140) to control basic functions of the electronic device 110. Such functions may include, for example, interaction among various internal components, control of the camera 120 and/or the component interface 170, and storage and retrieval of applications and data to and from the memory 140.

The device 110 may also include a component interface 170 to provide a direct connection to auxiliary components or accessories and a power supply 180, such as a battery, for providing power to the device components. In an embodiment, all or some of the internal components communicate with one another by way of one or more internal communication links 190, such as an internal bus.

Further with respect to the applications, these typically utilize the operating system to provide more specific functionality, such as file system service and handling of protected and unprotected data stored in the memory 140. Although many applications may govern standard or required functionality of the user device 110, in many cases applications govern optional or specialized functionality, which can be provided, in some cases, by third party vendors unrelated to the device manufacturer.

Finally, with respect to informational data, e.g., program parameters and process data, this non-executable information can be referenced, manipulated, or written by the operating system or an application. Such informational data can include, for example, data that is preprogrammed into the device during manufacture, data that is created by the device, or any of a variety of types of information that is uploaded to, downloaded from, or otherwise accessed at servers or other devices with which the device is in communication during its ongoing operation.

In an embodiment, the device 110 is programmed such that the processor 130 and memory 140 interact with the other components of the device to perform a variety of functions. The processor 130 may include or implement various modules and execute programs for initiating different activities such as launching an application, transferring data, and toggling through various graphical user interface objects (e.g., toggling through various icons that are linked to executable applications).

Figure 2:
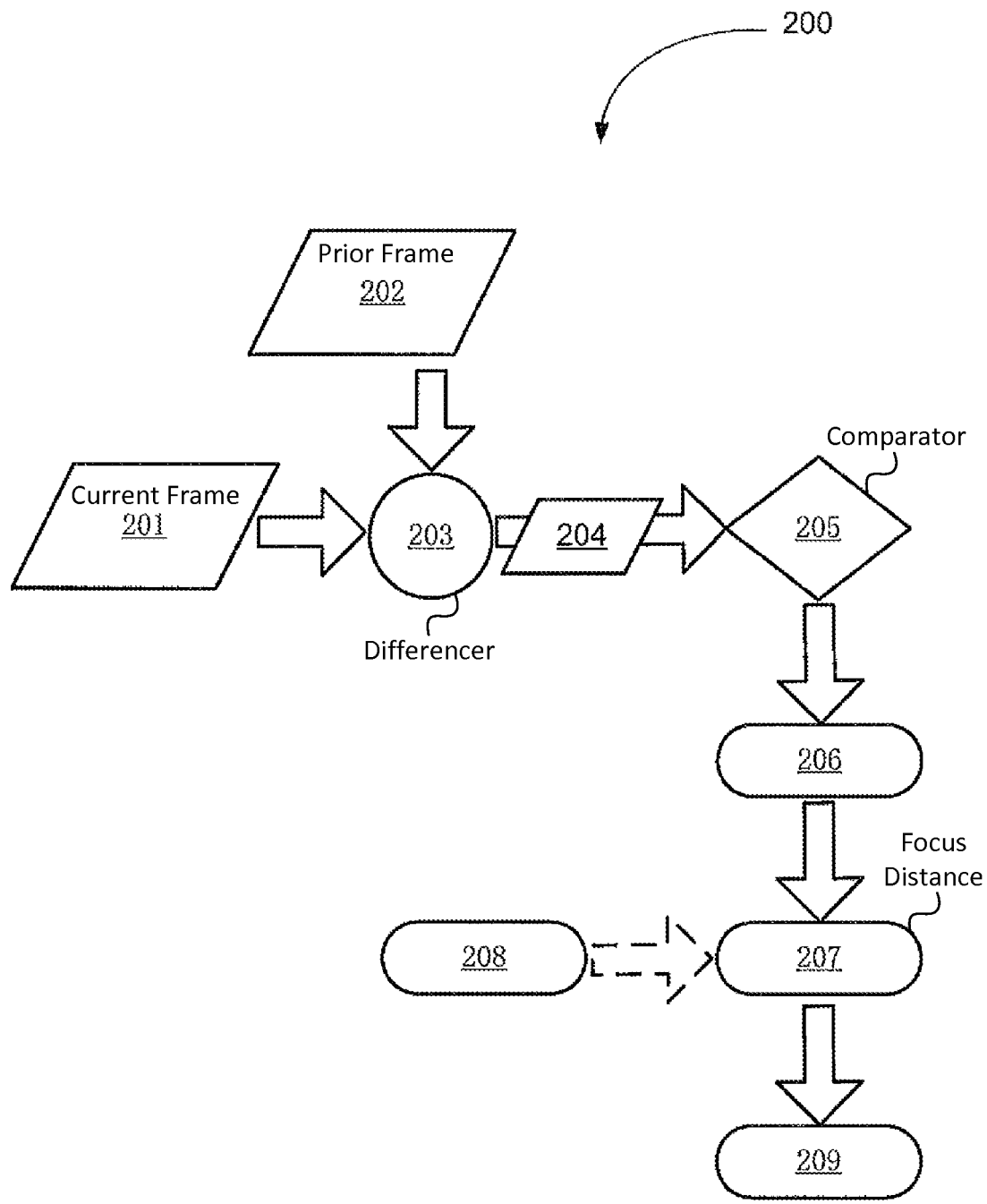
FIG. 2 is a schematic diagram of an auto focus system.

Within the context of prior auto focus systems, FIG. 2 illustrates a prior mechanism for auto focusing on a scene or portion thereof during operation of a camera such as camera 115. In the illustrated example 200, which is simplified for purposes of easier explanation, the camera controller first determines whether there is movement in the scene to determine whether to begin an auto focus routine. Typically, this entails capturing several frames. After each capture, the camera controller differences the sharpness of current frame 201 and the sharpness of the prior frame 202 in a differencer 203, and compares, at comparator 205, the resultant difference 204 to a threshold noise level in order to produce an auto focus decision 206. In particular, when the difference 204 is below the noise threshold for multiple frames, the controller identifies possible movement in the scene, and accordingly begins the auto focus routine.

Once the decision to begin auto focus is made, a camera controller typically varies the focus about the current focus and identifies a focus distance 207 with the highest focus value, i.e., the largest number of clean edges. If the user desires a different focus distance, they may provide a touch input 208 to the device screen, causing the focus to shift to a second distance 209 such that a selected object is in focus. However, as noted above, this type of system reduces the user's options to either (1) accepting the focus distance as corresponding to the scene element with the largest number of clean edges or (2) manually selecting the object upon which to focus. In addition, the method of identifying movement in order to trigger the auto focus routine takes a noticeable amount of time to execute, producing a lagged user experience.

Figure 3:
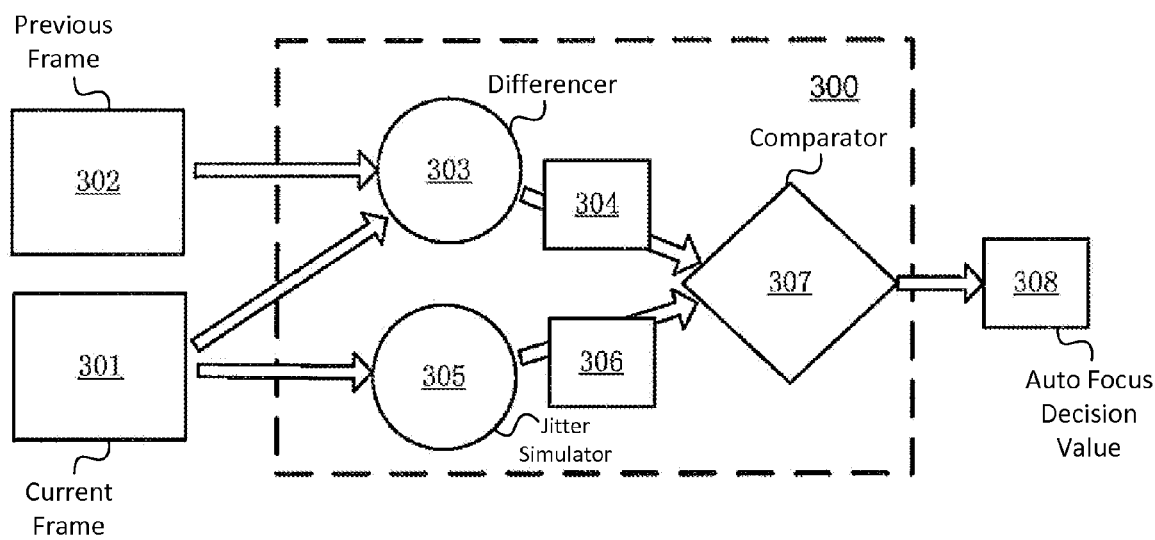
FIG. 3 is a schematic diagram of a movement analysis system in accordance with an embodiment of the disclosed principles.

The user experience may be enhanced by improving one or both of the auto focus decision architecture and the auto focus routine itself. An improved auto focus decision architecture in keeping with the disclosed principles is shown in FIG. 3. In particular, the architecture 300 shown in the schematic architecture view of FIG. 3 receives as input a current frame 301 and a previous frame 302. The current frame 301 and the previous frame 302 are input to a differencer 303. The differencer 303 provides a difference signal 304 based on the resultant difference between the current frame 301 and the previous frame 302.

Figure 4:
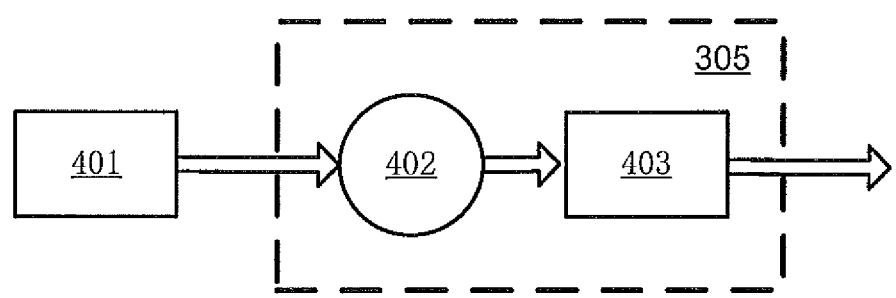
FIG. 4 is a schematic diagram of a jitter simulator in accordance with an embodiment of the disclosed principles.

Meanwhile, the current frame 301 is also provided as input to a jitter simulator 305, which outputs a jitter difference 306. The operation of the jitter simulator 305 will be described in greater detail below in reference to FIG. 4. However, continuing with FIG. 3 for the moment, the jitter difference 306 is provided as a reference value to a comparator 307. The difference signal 304 is also provided to the comparator 307 as an operand. The comparator 307 then compares the input difference signal 304 to the reference value (jitter difference 306) and outputs an auto focus decision value 308. In an embodiment, if the input difference signal 304 is greater than the jitter difference 306, the auto focus decision value 308 is positive, that is, refocusing is requested. Otherwise, a subsequent frame is captured and the current frame 301 becomes a previous frame to be input into the focus decision architecture 300 to evaluate the new current frame.

As noted above, the jitter simulator 305 produces a jitter difference 306 for use in evaluating the current frame 301. In an embodiment, the jitter simulator 305 processes the current frame 301 to simulate or predict the effect of jitter. An exemplary jitter simulator 305 is shown schematically in FIG. 4. The jitter simulator 305 in this embodiment operates only on the current frame 401. In particular, the current frame is received as input into a shifter 402 which shifts the pixels in the frame 401 by a predetermined amount and in a predetermined direction. While any amount and direction may be chosen, it has been found that a beneficial shift amount is about 5 pixels, and a beneficial shift direction is diagonally. Thus, for example, the shifter 402 may shift the pixels of the current frame 401 to the right and upward by 5 pixels to yield a diagonally shifted array 403.

No particular treatment of the pixel locations vacated by the shift is required, and the pixel values pushed out of frame by the shift may also be ignored. However, in an alternative embodiment, each vacated pixel location is populated by a copy of the pixel value that was shifted across it. In the context of the above example, this results in a smearing or copying of a portion of the frame left side values and a portion of the frame bottom values. Alternatively, the frame 401 may be looped, with the pixel values that are pushed out-of-frame being reintroduced in the opposite side or corner of the frame to populate the vacated pixel locations.

Figure 5A:
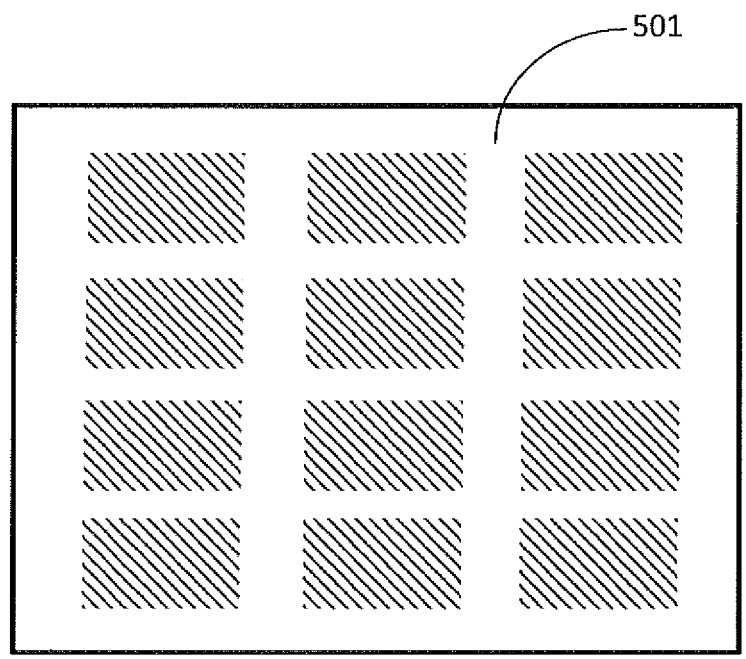
FIG. 5A is a simplified drawing of a scene with respect to which the disclosed principles may be implemented.
Figure 5B:
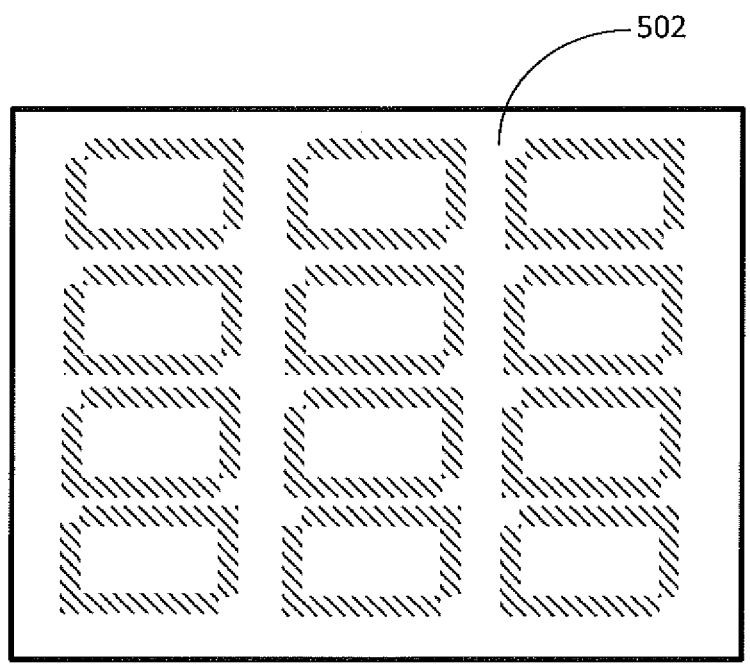
FIG. 5B is a simplified drawing of a jitter difference of the scene of FIG. 5A in accordance with an embodiment of the disclosure.

The diagonally shifted array 403 is then differenced at comparator 404 to produce a jitter difference 405, which is then provided to the comparator 307. The jitter difference 306, 405 provides a predictive measure regarding the likely results of scene movement without actually requiring scene movement. Thus, for example, a scene with many details and clean edges will result in a higher value jitter difference than will a scene with fewer details and clean edges. This effect can be seen in principle in FIGS. 5A, 5B, 6A and 6B. Referring to FIG. 5A, this figure shows a scene 501 having a large number of clean edges and details based on the presence of twelve fairly sharp rectangles. In an actual scene, these might be cars in a parking lot, boxes on shelves, blocks in a glass wall, and so on. FIG. 5B represents the effect of shifting the scene 501 slightly rightward and upward to yield a diagonal shift, and then differencing the original scene 501 and the shifted scene 501 to yield a jitter difference 502.

In an embodiment, mean pixel value is the measure of merit for each frame. In this embodiment, a jitter score is calculated as the mean pixel value of the current frame minus the previous frame, minus the mean pixel value of the jitter difference 502. As can be seen, the jitter difference 502 is significantly populated due to the movement of the many clean edges, which will lead to a high jitter score.

Figure 6A:
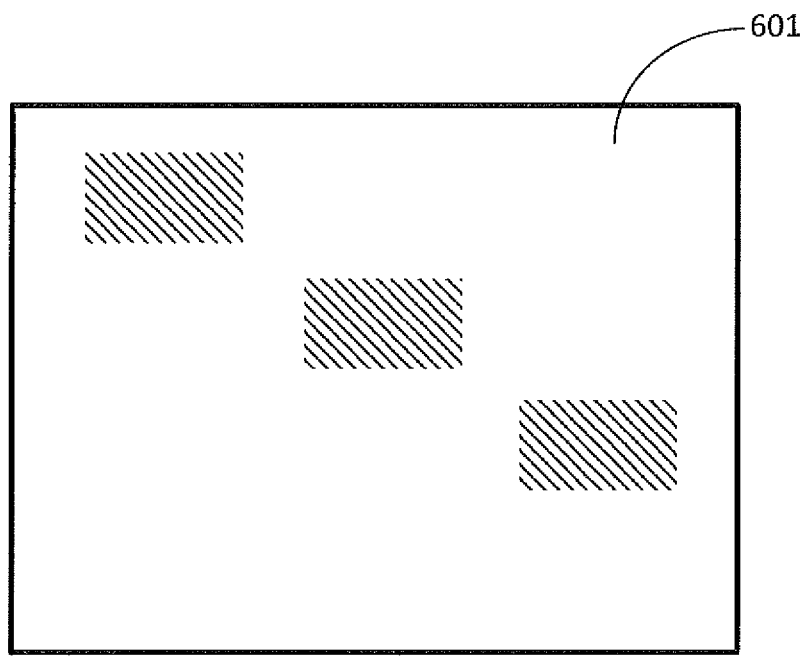
FIG. 6A is a simplified drawing of a further scene with respect to which the disclosed principles may be implemented.
Figure 6B:
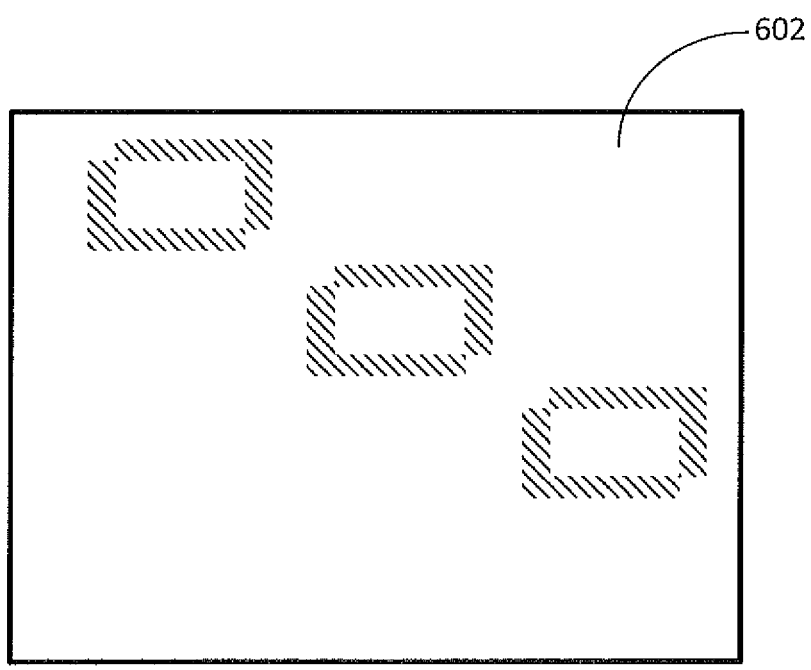
FIG. 6B is a simplified drawing of a jitter difference of the scene of FIG. 6A in accordance with an embodiment of the disclosure.

FIGS. 6A and 6B represent a scene and its jitter difference for a less detailed scene. In particular, the original scene 601 has few clean edges or details, being populated by only three clean-edged rectangles. The result of jittering the original scene and differencing the result with the original scene is shown in FIG. 6B. As can be seen, the resultant jitter difference 602 is far less populated than the resultant jitter difference 502 of the much more complicated scene 501 of FIG. 5A, leading to a lower jitter score.

In a sense, the jitter difference and jitter score can be seen as a prediction of how much effect a small scene movement would have on the inter-frame difference. By traditional measures, a small movement in a complicated scene would register as a larger movement than the same small movement in a less complicated scene. In traditional systems, this results in constant refocusing on complicated scenes and an inability to settle or stabilize focus in such environments. Conversely, the same traditional systems may underestimate the amount of movement in simpler scenes, leading to a failure to refocus when focusing is otherwise needed.

Against this backdrop, the disclosed auto focus decision architecture provides a scene-specific reference against which to measure the significance of observed movement between a first frame and a second frame. In other words, the movement threshold for complex scenes will be greater than the movement threshold for less complicated scenes. This allows the auto focus function to provide the same experience regardless of whether the scene is high contrast or low contrast.

Figure 7:
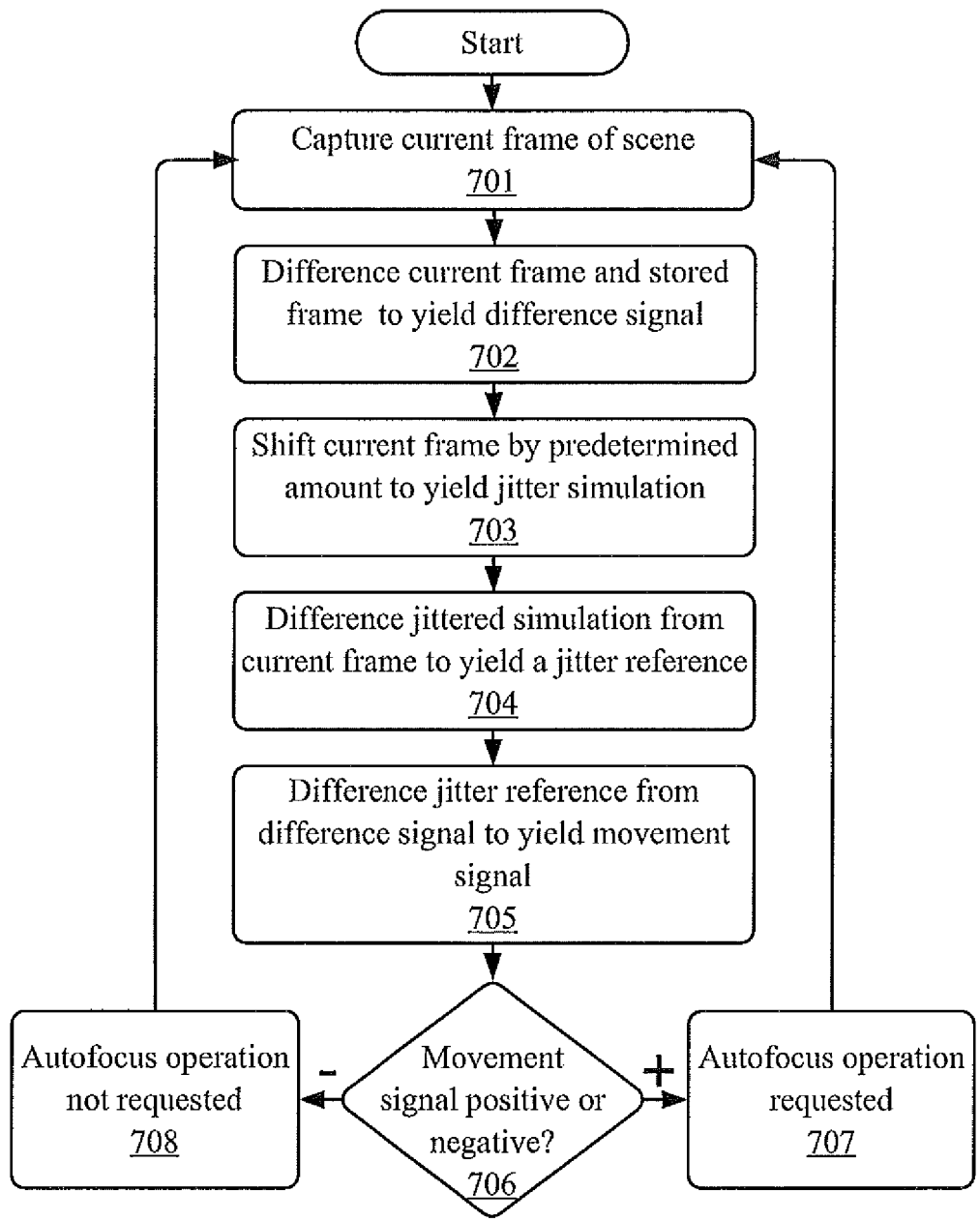
FIG. 7 is a flow chart of a process for detecting movement of a scene in accordance with an embodiment of the disclosure.

While the disclosed decision architecture may be implemented in a variety of ways, an exemplary decision process 700 is shown in the flowchart of FIG. 7. Although this example assumes an architecture that is similar to that shown herein, those of skill in the art will appreciate that changes in the architecture and corresponding changes in the process flow may be made without departing from the disclosed principles.

At stage 701 of the process 700, a current frame corresponding to a scene is captured, e.g., by the camera 115, it being understood that a prior frame corresponding essentially to the same scene has been previously stored during a prior iteration of the process 700. The current frame is differenced with the stored prior frame at stage 702 to yield a difference signal (e.g., difference signal 304).

The current frame is also shifted by a predetermined amount, e.g., a predetermined number of pixels, in a predetermined direction at stage 703 to produce a jitter simulation. It will be appreciated that the exact direction and exact amount of the shift are not critical. Moreover, although the shift is predetermined, there may be multiple such predetermined shifts that vary in direction and amount. For example, of three predetermined shifts, the shifts may be applied randomly, cyclically, or otherwise.

At stage 704, the jittered simulation is differenced from the current frame to provide a jitter difference, which is in turn differenced at stage 705 from the difference signal to produce a movement signal. If the difference signal exceeds the jitter difference, then the movement signal is positive, whereas if the jitter difference exceeds the difference signal then the movement signal is negative. At stage 706, it is determined whether the movement signal is positive or negative. If it is determined at stage 706 that the movement signal is positive, then an auto focus operation is requested at stage 707, while if the movement signal is negative, then the process flows to stage 708 and an auto focus operation is not requested. From either of stages 707 and 708, the process 700 returns to stage 701.

In an embodiment, the magnitude of the positive movement signal is further used to determine auto focus behavior at finer granularity than a simple binary decision. In particular, in this embodiment, if the movement signal is positive and relatively small, then a small focus adjustment is attempted. Conversely, if the signal is positive and relatively large, then a larger focus adjustment may be needed.

In this way, small focus adjustments, e.g., using a continuous auto-focus algorithm, may be used to provide a better user experience when possible without causing slow focus adjustment when large adjustments are needed. Similarly, larger focus adjustments, e.g., using an exhaustive auto-focus algorithm, may speed the focusing task when needed. By making a calculated decision on when small or large adjustments are needed the system can deliver an improved user experience and better focus performance.

In an embodiment, when a large focus change is required, e.g., when the positive movement signal at stages 706 and 707 exceeds a predetermined refocus value, the camera controller refocuses the camera without regard to the present focus distance. In overview, this process, discussed below with reference to FIGS. 8 and 9, entails setting the focus distance to zero (or its lowest value), and increasing the focus distance in coarse increments over the entire focus range to identify, with relatively low accuracy, where in the range peaks may be located. A finer scan is then executed around the closest peak to identify the focus distance for the closest object in the scene. When the first closest object is in focus, the focus distance is set and the auto focus operation ceases.

Figure 8:
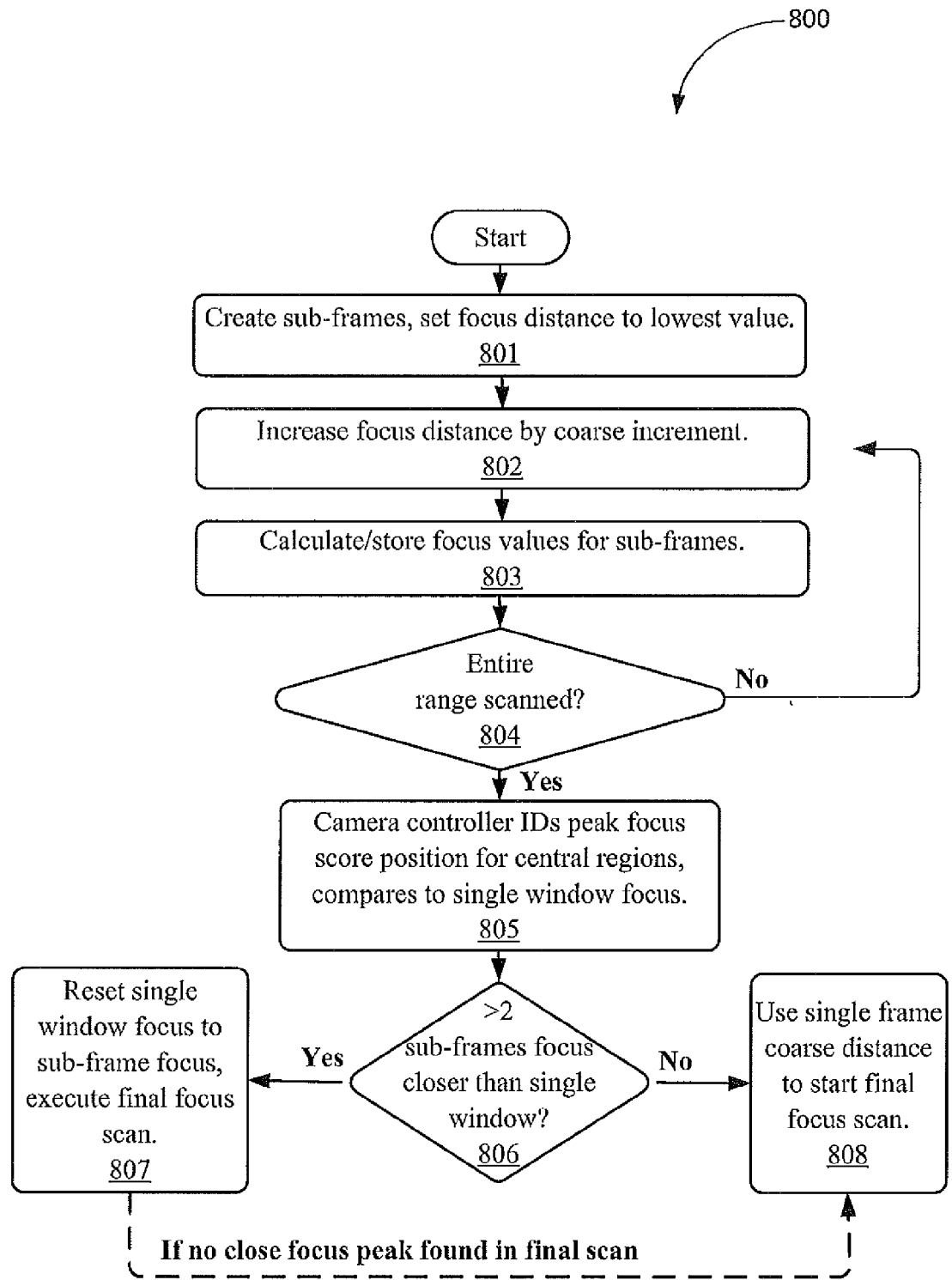
FIG. 8 is a flow chart of a process for executing an auto focus routine in accordance with an embodiment of the disclosure.

Turning now to FIG. 8, an exemplary auto focus process 800 is shown in greater detail. At stage 801 of the auto focus process 800, the camera controller divides the frame into multiple sub-frames, e.g., 16×8 sub-frames, and sets the camera focus distance to its lowest, or closest, value. Typically, a camera will have a closest distance, such as 30 cm, at which the camera can focus. The reason for dividing the frame into sub-frames is that small objects or objects with lower contrast than the background may not be detected using a single focus window system.

At stage 802, the camera controller increases the focus distance in coarse increments, e.g., increments of 15 cm. The camera controller may support any desired granularity or increment size, with the understanding that larger increment sizes provide lower distance resolution but may speed the auto focusing process. In an embodiment, while larger increments are used at stage 802, these are reduced in later steps as will be described.

At stage 803, the camera controller calculates, e.g., via the GPU, a present focus value for each region or sub-frame as presently focused and records the present focus value. The camera controller then determines, at stage 804, whether the camera has scanned its entire range of focus. If the camera has not scanned its entire range, then the process 800 returns to stage 802 to again increment the focus distance in coarse increments and record additional focus values.

If it is determined at stage 804 that the camera has performed the coarse scan over its entire range of focus, then at stage 805, the camera controller identifies a peak focus score position for a number of central regions, e.g., the center 4×4 regions, and compares them to a focus position according to a primary single window focus algorithm.

At stage 806, if two or more of the smaller focus regions is found to be closer than the single window focus position, then the single window focus is reset at stage 807 to the relevant sub-frame focus and a final focus scan is executed starting at this point at stage 808. The use of the single window focus system at this stage provides higher focus detection accuracy since it is using full resolution data as an input to the focus filters. In an embodiment, if no focus peak is detected by the single window focus scan at stage 807, then another final scan may be started at the starting position indicated by the single window coarse focus scan as in stage 809. In addition, if two or more of the smaller focus regions are not closer than the single window focus position, then the single window position is automatically used at stage 809 to start a final scan.

Figure 9:
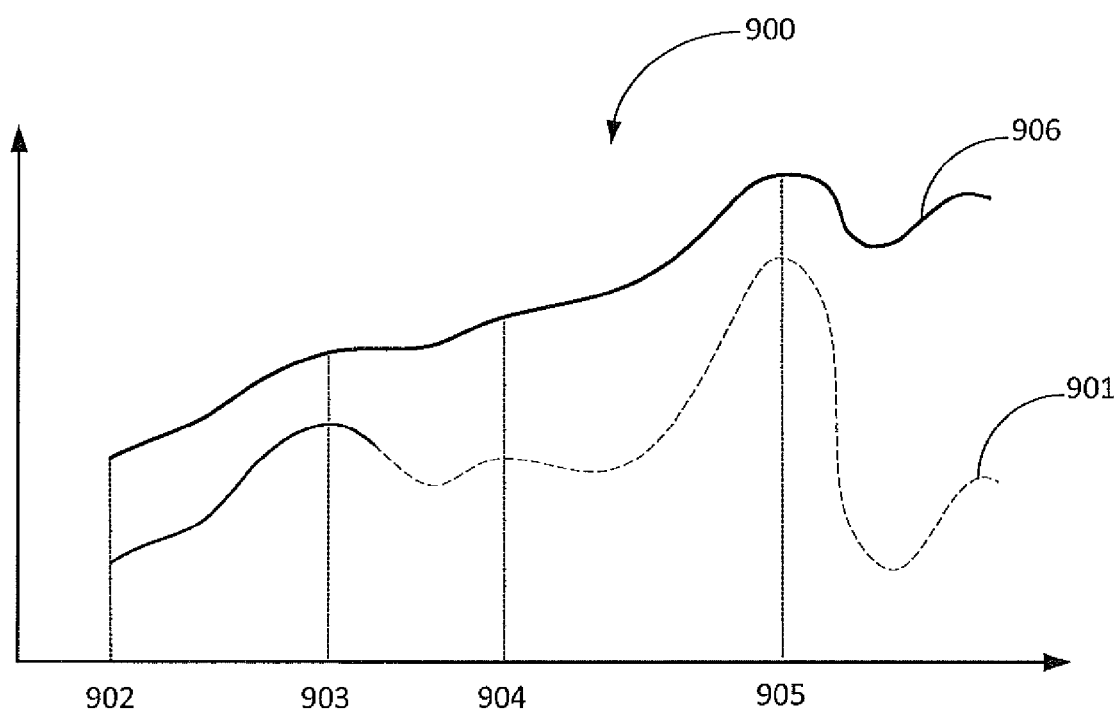
FIG. 9 is a simulated data plot showing focus values as a function of distance for a sample scene in accordance with an embodiment of the disclosure.

An example of normalized recorded focus values is shown in FIG. 9. In particular, the simulated data plot 900 of FIG. 9 shows normalized focus values 901 as a function of distance for a given sub-frame. As can be seen, the normalized focus values increase from the closest distance 902 as the distance approaches the closest local maximum 903. As the distance increases in this range, the process 800 results in a return from stage 804 to stage 802. As can be seen from the dashed portion 904 of the simulated data plot 900, the scene contains other objects and elements that create local maxima 904, 905 in the focus value, but the local maximum 903 represents the closest such object or element for the sub-frame.

Simulated plot 906 shows a normalized and shifted plot of focus values for the single screen coarse focus scan. As can be seen, the single screen coarse focus scan does not strongly respond to the object seen in the sub-frame scan data 900. Thus, the sub-frame scans allow fast identification of close objects, and the final scan allows finer focus resolution for such objects.

It will be appreciated that the disclosed principles provide a means for quickly and efficiently focusing on the closest object in a scene, e.g., a flower against a background of grass, the closest coin in a pile of coins, and so on. However, in view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of automatically setting a camera focus distance for a scene, comprising:
   dividing the scene into multiple sub-frames;
   setting the camera focus distance to a lowest possible setting;
   identifying range peaks in the scene as a whole and in one or more of the sub-frames by increasing the camera focus distance in first increments over a first focus range in a first scan;
   identifying a focus distance at which a closest object in the scene is in focus by executing a second scan over a second focus range having a starting point based on the identified range peaks; and
   setting the camera focus distance to the focus distance at which the identified closest object is in focus.

2. The method of claim 1, further comprising:
   capturing, with the camera, an image of the scene at the set focus distance.

3. The method of claim 1, wherein the first scan range begins at a closest settable focus distance and ends at a furthest settable focus distance.

4. The method of claim 3, wherein the second focus range is smaller than the first focus range.

5. The method of claim 3, wherein the second scan comprises increasing the focus distance in second increments over the second focus range, the second increments being smaller and the first increments.

6. The method of claim 5, further comprising:
   executing a third scan by increasing the focus distance in the second increments over the first scan range to identify the closest object if the second scan does not identify the closest object.

* * * * *